United States Patent [19]

Kleijne

[11] Patent Number: 4,807,284
[45] Date of Patent: * Feb. 21, 1989

[54] SECURITY DEVICE FOR SENSITIVE DATA

[75] Inventor: Theodoor A. Kleijne, Dreumel, Netherlands

[73] Assignee: NCR Corporation, Dayton, Ohio

[*] Notice: The portion of the term of this patent subsequent to Jun. 3, 2003 has been disclaimed.

[21] Appl. No.: 58,730

[22] Filed: Jun. 5, 1987

[30] Foreign Application Priority Data

Sep. 24, 1986 [GB] United Kingdom ............... 8622975

[51] Int. Cl.⁴ ............................................. H04L 9/00
[52] U.S. Cl. ............................................. 380/3; 380/4; 380/52; 380/59
[58] Field of Search ........................ 380/314, 52, 59; 340/825.54

[56] References Cited

U.S. PATENT DOCUMENTS

| 4,593,384 | 6/1986 | Kleijne | 365/228 |
| 4,656,463 | 4/1987 | Anders et al. | 340/825.54 |
| 4,685,056 | 8/1987 | Barnsdale, Jr. et al. | 380/4 |
| 4,691,350 | 9/1987 | Kleijne | 380/3 |

FOREIGN PATENT DOCUMENTS 8404614 11/1984 United Kingdom .

OTHER PUBLICATIONS

U.S. patent application Ser. No. 877,907, filed Jun. 24, 1986, Kleijne et al., assigned to NCR Corporation, entitled, "Data Security Device for Protecting Stored Data".

Primary Examiner—Salvatore Cangialosi
Attorney, Agent, or Firm—Wilbert Hawk, Jr.; Albert L. Sessler, Jr.; Richard W. Lavin

[57] ABSTRACT

A device (10) for protecting stored sensitive data includes a housing (12) formed by six plates P1-P6 inclusive each carrying a conductive path segment formed by thick film deposition techniques and each having a winding configuration covering substantially the entire inner surface of the plate. The four side plates P2-P5 inclusive are mounted on a printed circuit board (PCB 14) which is mounted on the base plate (P6). The conductive path segments on the side and base plates (P2-P6 inclusive) are interconnected to form a wire mesh by conductive epoxy material connecting the path segments on the side and base plates (P2-P6 inclusive) with conductive tracks on the PCB (14). The conductive path segment on the top plate (P1) is connected by conductive wires (58, 60), which extend through plated through holes (B9, B10) in the PCB (14).

6 Claims, 8 Drawing Sheets

SECURITY DEVICE FOR SENSITIVE DATA

BACKGROUND OF THE INVENTION

This invention relates to a security device for protecting stored sensitive data.

International Patent Application No. WO84/04614 discloses a data security device which includes a container formed of a brittle material such as prestressed glass and which includes a data processor, a volatile CMOS RAM memory device for storing encryption key data, and a battery forming the power supply for the memory device. The container consists of a housing and a lid. The battery is connected to the memory device by a power supply conductor formed in a winding path configuration on the interior surfaces of the housing and the lid, the parts of the power supply conductor on the housing and lid being connected by pairs of contacts at the joint faces between the housing and the lid. The conductor is formed by an evaporated metal thin film material. The power supply conductor pattern is bifilar and the parts of the conductor are interleaved with additional conductors on the interior surfaces of the housing and lid which are grounded or connected to a voltage source. Thus, if the power supply conductor is interrupted or connected to either of the additional conductors the power supply to the volatile RAM would be altered to the degree that the data in the RAM would be destroyed. The known device has the disadvantage of having a relatively low level of security since the width of the power supply conductor provided on the housing must be maintained sufficiently great to enable the provision of an adequate power supply to the memory device. Such relatively wide conductors are subject to the possibility of penetration. For example, it could be possible to produce a hole of sufficiently small diameter to maintain a conductive path in a relatively wide power supply conductor, yet enable unauthorized access to the memory device via the hole. Furthermore, the thin film technology utilized in the manufacture of the known device results in high device cost.

U.S. Pat. No. 4,593,384 issued June 6, 1986 and assigned to the assignee of the present application discloses a security device for the secure storage of sensitive data including a ceramic housing which is formed of six ceramic plates connected together and which contains electronic circuitry including a resettable shift register memory storing sensitive data. The electronic circuitry is mounted on a ceramic support member which is mounted on the bottom plate prior to assembly of the housing. On each plate is provided a pair of conductive path portions disposed in superposed relationship and having complementary zig-zag configurations. The conductive path portions on the plates are interconnected by conductive epoxy interconnections to form first and second conductive paths. Interruption of either conductive path by an attempt to break into the housing causes a reset signal generator to erase the contents of memory. This security device has the disadvantage of being complex in its construction and hence expensive to manufacture.

European Patent Application No. 0142013 discloses a portable data carrier for receiving, storing and outputting information. Data input-output is effected over contactless transfer elements, for example, inductive transfer elements, or over a plug and socket connection. In one embodiment, a printed circuit board carrying circuitry to be protected is enclosed in a housing having sensing sheets provided on the inner surface thereof, which sheets can detect damage to the housing. The sensing sheets are interconnected by contact pins mounted on the circuit board. However, it is not disclosed how a meandering path configuration could be serially interconnected.

It is therefore an object of the present invention to provide a security device for protecting stored sensitive data which is relatively simple to manufacture and hence is a relatively low-cost device, yet which has a high degree of security against unauthorized access.

Therefore, according to a preferred embodiment of the present invention, there is provided a security device for protecting stored sensitive data, including a closed housing containing a memory means adapted to store sensitive data and including a top part, a base part and a plurality of side parts having respective conductive path segments provided thereon, and interconnection means arranged to electronically interconnect said conductive path segments to form conductive path means, the interruption of which, brought about by an attempt to penetrate said housing, causes the erasure of the contents of said memory means, wherein said device includes a printed circuit board on which said memory means is supported, wherein said side plates are mounted on said printed circuit board which is mounted on said base plate, and wherein said interconnection means includes conductive track means provided on said printed circuit board and conductive wires extending from said top part through apertures in said printed circuit board to thereby connect with said conductive track means on said printed circuit board.

It will be appreciated that a security device according to the present invention has the advantage of a simple construction and ease of manufacture. Furthermore since the conductive wires pass through apertures in the printed circuit board, and the side parts are mounted on the printed circuit board, the security module is adapted for simple and secure manufacture.

A preferred embodiment of the present invention will now be described in conjunction with the following description, claims and drawings.

DETAILED DESCRIPTION OF THE INVENTION

Figure 1:
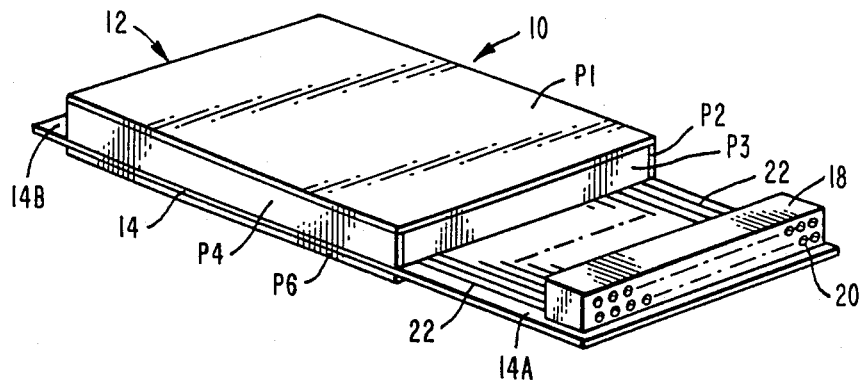
FIG. 1 is a perspective view of a security device constructed according to the invention.
Figure 2:
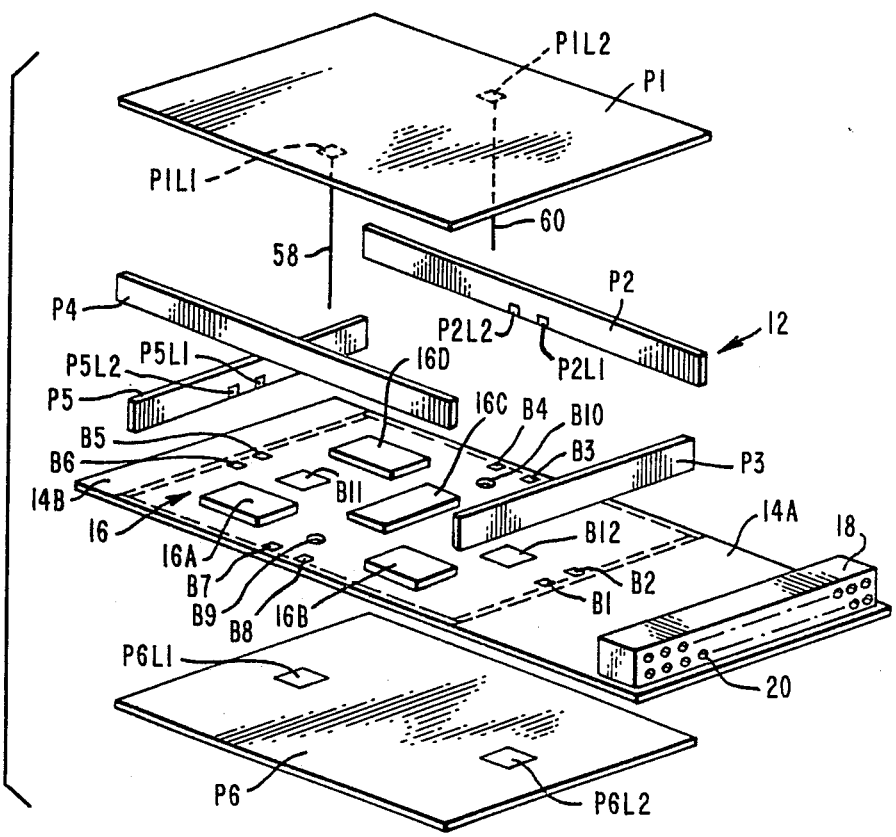
FIG. 2 is an exploded perspective view of the security device shown in FIG. 1.

Referring first to FIGS. 1 and 2 of the drawings, a security device 10 constructed according to the invention includes a housing 12 which is formed by a top plate P1, side plates P2-P5 inclusive and a base plate P6. The six plates P1-P6 inclusive are preferably formed by a ceramic material, since ceramic material is highly resistant to chemical attack. A printed circuit board 14 has mounted thereon in a conventional manner electronic circuitry 16 including individual electronic circuit components such as 16A, 16B, 16C, 16D, shown schematically in FIG. 2. The components 16A-16D inclusive are interconnected by conductive leads (not shown) which may be provided on both sides of the printed circuit board 14 in a well-known manner.

A portion 14A of the printed circuit board 14 extends beyond the housing 12 and has mounted thereon a connector 18 having a plurality of sockets 20 for connection to external circuitry (not shown) in an apparatus with which the security device 10 is being used. The sockets 20 are electronically connected with the circuit components 16A-16D inclusive by conductive leads 22 (FIG. 1) provided on the printed circuit board extension 14A. The printed circuit board 14 is mounted on the base plate P6, and has the side plates P2-P5 inclusive mounted thereon, as will be described in more detail hereinafter. A portion 14B of the printed circuit board extends a short distance beyond the housing 12 to facilitate the manufacture of the housing 11.

The inner surfaces of the six plates P1-P6 inclusive are provided with respective meandering conductive path segments (not shown in FIGS. 1 and 2). The disposition and interconnection of the conductive path segments on the respective plates P1-P6 inclusive will be described in more detail hereinafter. As part of the means for interconnecting the conductive path segments, there are provided conductive wires 58, 60 which extend from the top plate P1 through plated holes B9, B10, in the printed circuit board 14. It should be understood that the holes B9, B10 are such that a conductive coating (plating) is provided on the surface of the printed circuit board 14 extending through the holes in a known manner. The conductive wires 58, 60 may be of tin plated copper material having a diameter of about 0.3 mm and the plated holes B9, B10 may have a diameter of about 0.5 mm, enabling the wires 58, 60 to be readily passed through the holes B9, B10 during assembly of the security device 10.

Figure 3A:
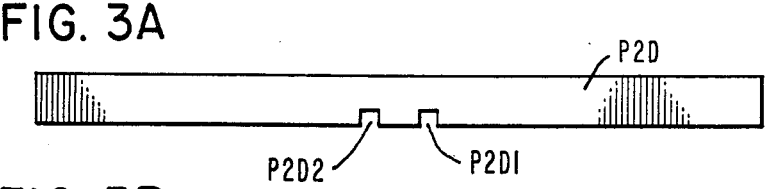
FIGS. 3A and 3B are views illustrating the insulator and conductive layers located on the inner surface of one of the side plates of the security device shown in FIG. 1.
Figure 3B:
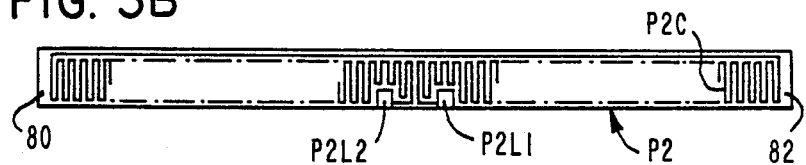

Referring to FIGS. 3A and 3B, there is shown in FIG. 3A a dielectric glass layer P2D which overlies a conductive path segment P2C (FIG. 3B) formed on the plate P2. The conductive path segment P2C has a meandering configuration over substantially the entire surface of the plate P2, except for narrow end regions 80, 82 which receive the ends of the side plate P3, P5 when the housing 12 is assembled.

The conductive path segment P2C terminates in conductive islands P2L1, P2L2. The dielectric glass layer P2D has notches P2D1, P2D2 which overlie the conductive islands P2L1, P2L2 such that electrical contact can be made to the islands. The plate P4 is identical to the plate P2.

Figure 4A:
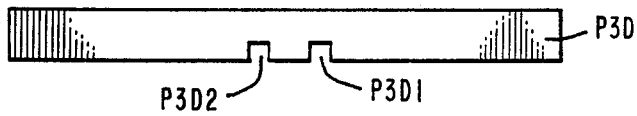
FIGS. 4A and 4B are views illustrating the insulator and conductive layers located on the inner surface of another of the side plates of the security device shown in FIG. 1.
Figure 4B:
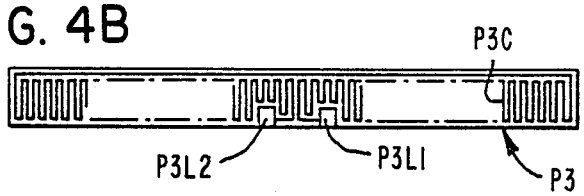

Referring to FIGS. 4A and 4B, there is shown in FIG. 4A a dielectric glass layer P3D which overlies a conductive path segment P3C formed on the plate P3. The conductive path segment P3C has a meandering configuration over substantially the entire surface of the plate P3 and terminates in conductive islands P3L1 and P3L2. The dielectric glass layer has notches P3D1, P3D2 which overlie the conductive islands P3L1, P3L2 such that electrical contact can be made to the islands. The plate P5 is identical to the plate P3.

Figure 5A:
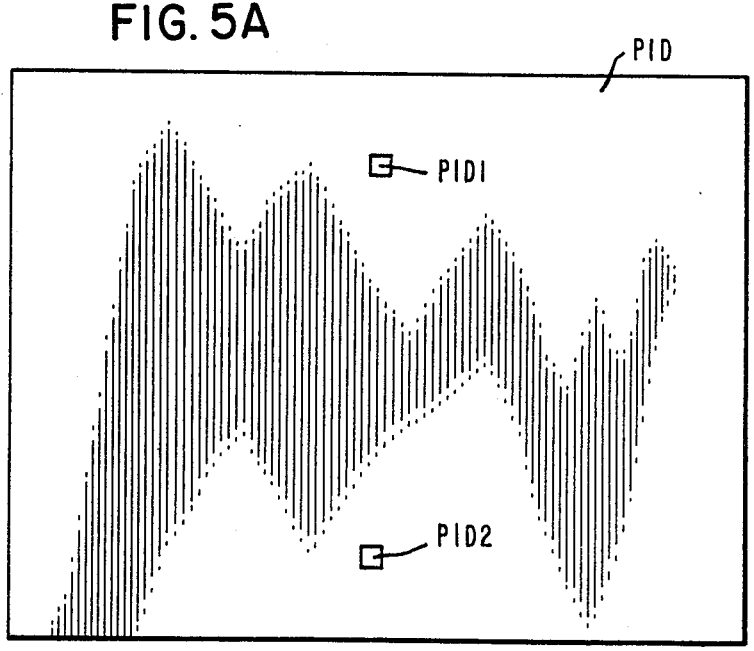
FIGS. 5A and 5B are views illustrating the insulator and conductive layer located on the inner surface of the top plate of the security device shown in FIG. 1.
Figure 5B:
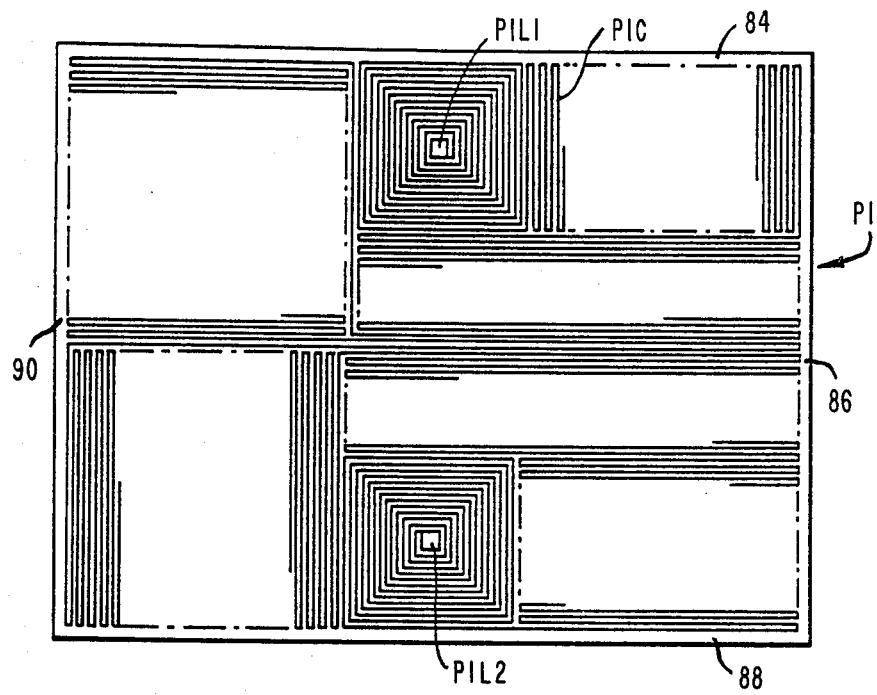

Referring to FIGS. 5A and 5B, there is shown in FIG. 5A a dielectric glass layer P1D which overlies a conductive path segment P1C, FIG. 5B, formed on the plate P1. The conductive path segment P1C has a meandering configuration over substantially the entire surface of the plate except for narrow edge regions 84, 86, 88, 90, which receive the edges of the side plates P2-P5 when the housing 12 is assembled. The conductive path segment P1C terminates in conductive islands P1L1 and P1L2. The dielectric glass layer P1D has holes P1D1, P1D2 therein which overlie the conductive islands P1L1, P1L2, such that electrical contact can be made to the islands.

Figure 6A:
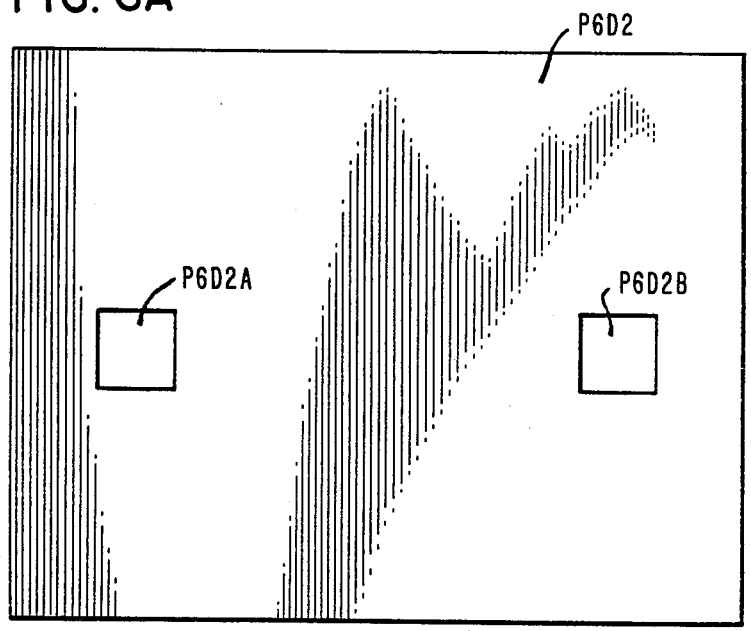
FIGS. 6A–6D inclusive are views illustrating insulator and conductive layers located on the inner surface of the base plate of the security device shown in FIG. 1.
Figure 6B:
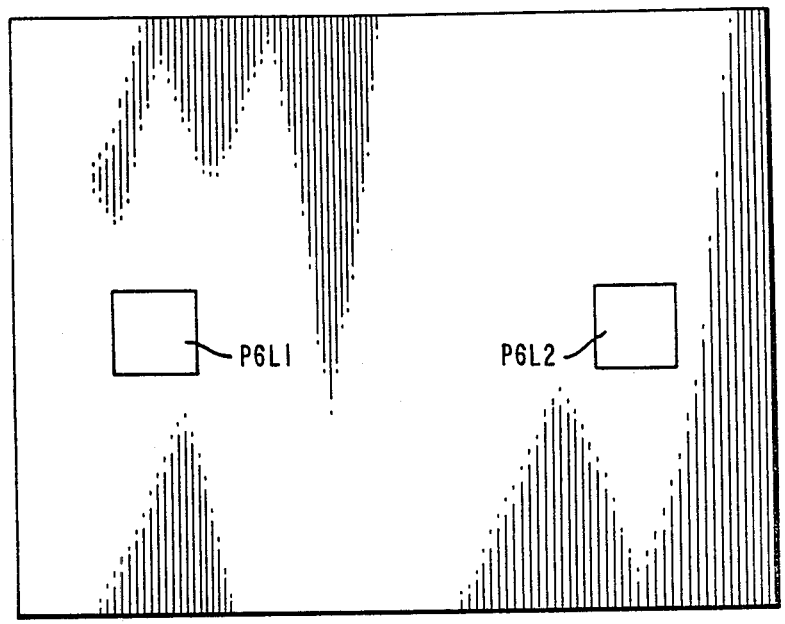
Figure 6C:
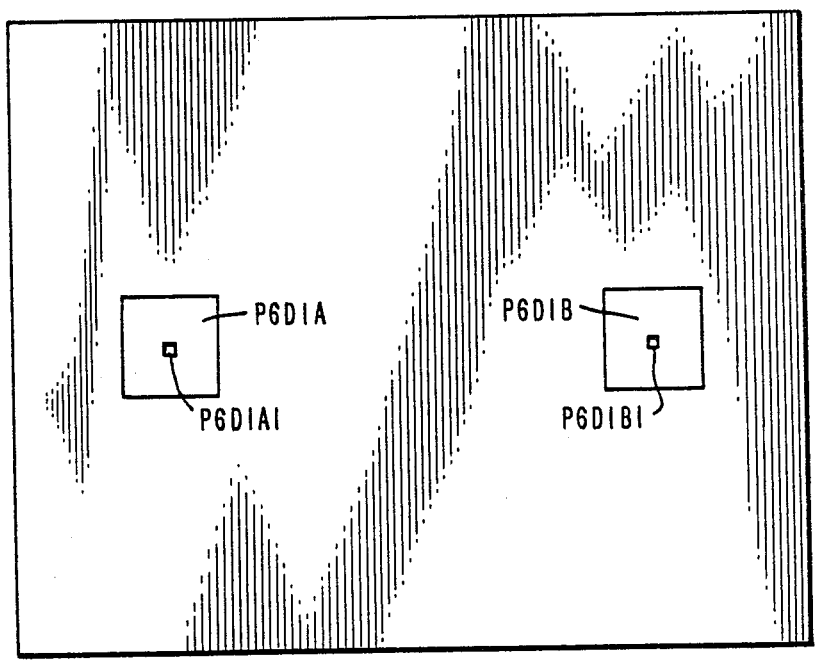
Figure 6D:
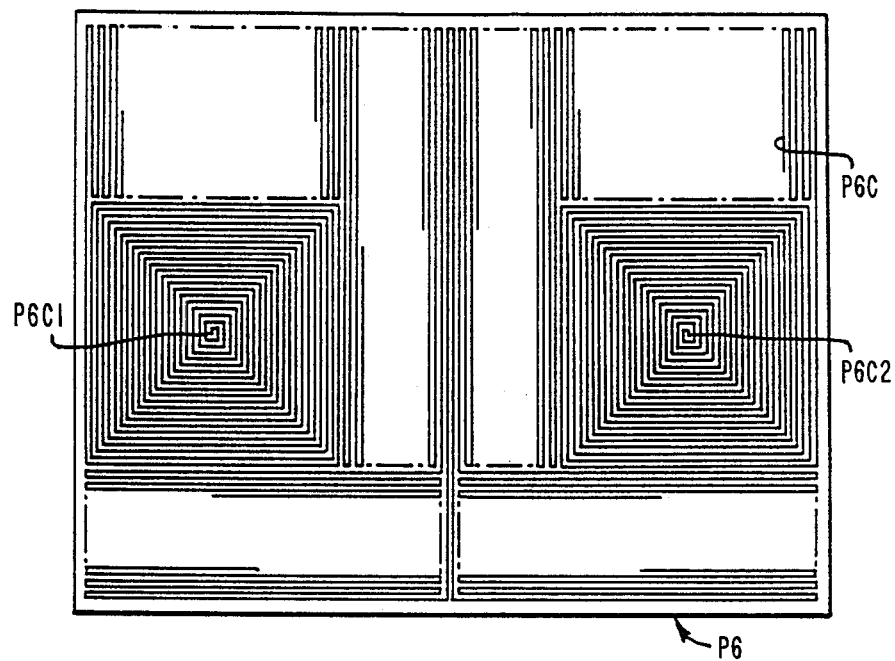

Referring to FIGS. 6A to 6D inclusive, there is shown in FIG. 6A a dielectric glass layer P6D2 having holes P6D2A and P6D2B therein. The holes P6D2A, P6D2B overlie conductive islands P6L1 and P6L2 (FIG. 6B). The conductive islands P6L1, P6L2 overlie dielectric regions P6D1A and P6D1B (FIG. 6C). The dielectric regions P6D1A, P6D1B have respective holes P6D1A1, P6D1B1 therein which overlie the ends P6C1, P6C2 of a conductive path segment P6C which has a meandering configuration over substantially the entire surface of the base plate P6 as shown in FIG. 6D. It should be understood that the conductive islands P6L1, P6L2 on the plate P6 are larger in area than the conductive islands on the plates P1-P5 inclusive, and that the described construction permits the meandering conductive path segment P6C on the plate P6 to substantially cover the area of the islands P6L1, P6L2, thereby providing additional security with respect to the relatively large areas of such islands.

It should be understood that the respective conductive and insulator layers, which are superposed on the inner surfaces of the plates P1-P6 inclusive, are formed by conventional thick film deposition techniques. Such techniques are well-known and will not be described in detail herein. Briefly, for each conductive and insulator layer, a different screen is prepared and used to deposit a conductive or insulator paste. After each screening, the layered plate is heated to about 800 degrees Celsius to harden the deposited paste. The thickness of the conductive layer formed in this manner is in the range of about 10-15 microns. Furthermore, the width and spacing of the meandering conductive path segments P1C-P6C inclusive are both about 300 microns.

Figure 8:
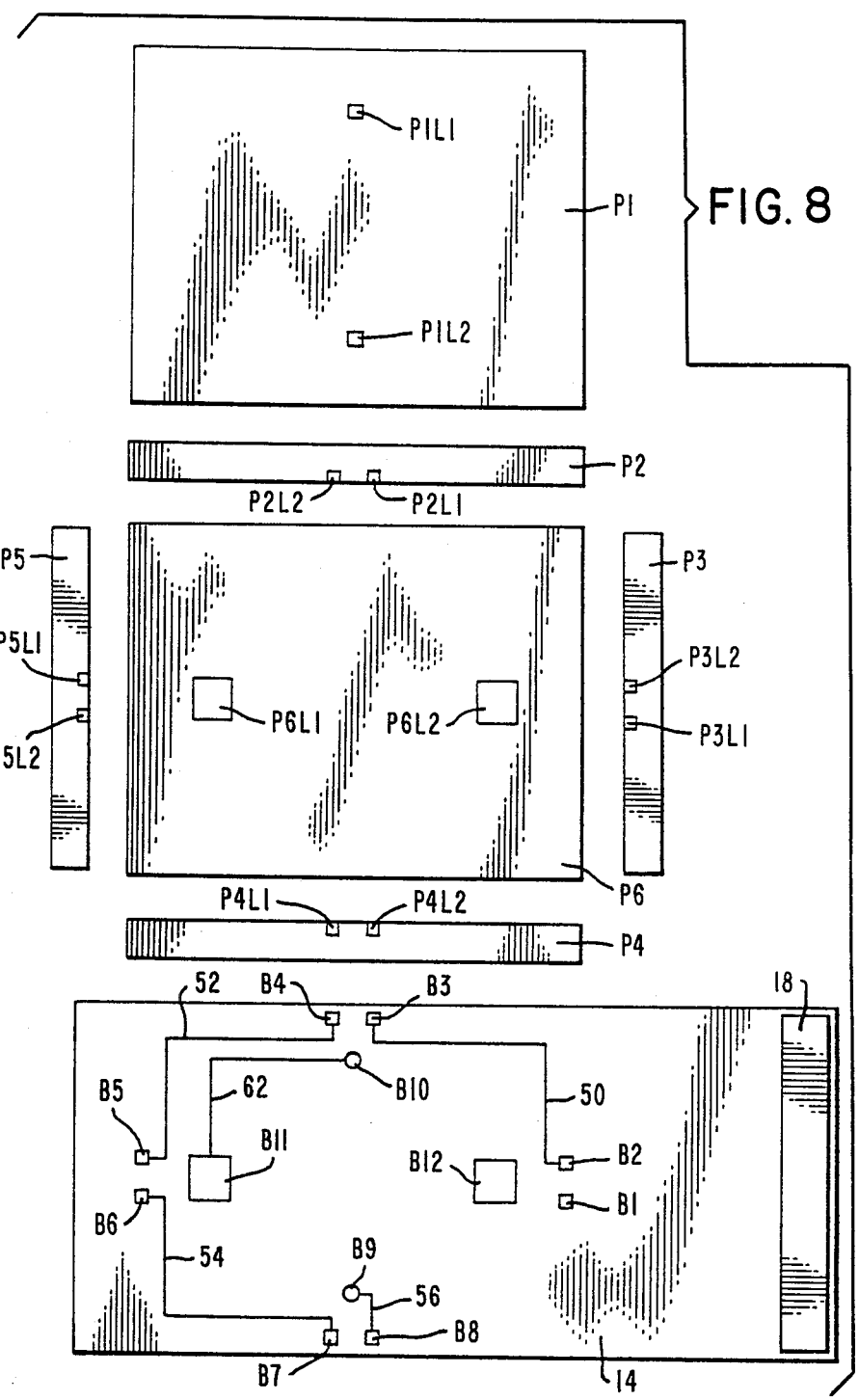
FIG. 8 is a schematic view of portions of the security device showing the locations of conductive interconnection islands on the plates forming the security device and on the printed circuit board.

Referring to FIGS. 2 and 8, the printed circuit board 14 is provided with conductive islands B1-B8 inclusive which are connected in the assembled housing 12 with conductive islands on the side plates P2-P5 inclusive. The printed circuit board is also provided with plated through holes B9, B10, previously described and with conductive regions B11 and B12 which extend through the thickness of the printed circuit board 14.

Figure 7:
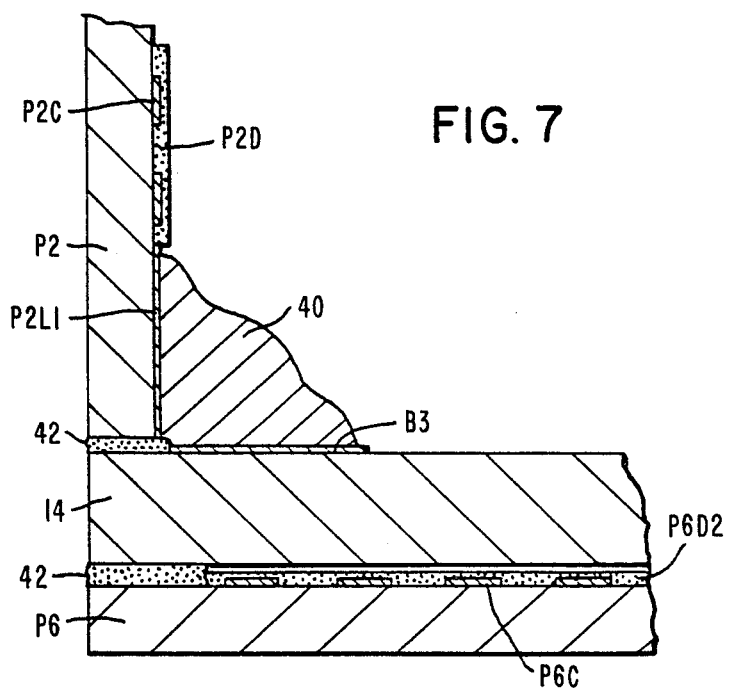
FIG. 7 is a partial sectional view of the security device showing the manner in which electrical interconnections are made between one of the side plates and a printed circuit board included in the security device shown in FIG. 1.

Referring briefly to FIG. 7, there is shown a partial cross-sectional view through the plates P2 and P6 and the printed circuit board 14 in the assembled security device 10. The conductive island P2L1 (FIG. 3B) on the side plate P2 is electrically connected to a conductive island B3 on the printed circuit board 14 by conductive epoxy bonding material 40. The remaining connections between the conductive islands B1-B8 inclusive on the printed circuit board 14 and the conductive islands on the side plates P2-P5 inclusive are formed in identical manner using conductive epoxy material 40. The conductive epoxy material 40 has the advantage of being flexible so as to compensate for differences in the thermal expansion coefficients of the material of the printed circuit board 14 and the ceramic material of the plates P1-P6 inclusive. Other flexible conductive bonding materials, such as silver filled silicone could be used instead of conductive epoxy. Also shown in FIG. 7 is nonconductive ceramic filled epoxy bonding material 42 which bonds the printed circuit board 14 to the side plate P2 and the base plate P6.

Figure 9:
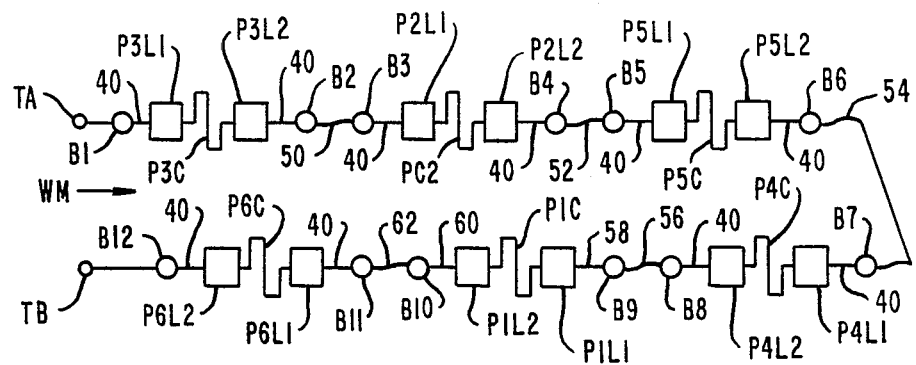
FIG. 9 is a schematic diagram showing the manner in which electrical interconnections are made between the six plates and the printed circuit board.

The interconnection of the conductive path segments P1C-P6C inclusive on the six plates P1-P6 inclusive form a single conductive path, referred to herein as a wire mesh WM, which will now be described, with particular reference to FIGS. 8 and 9. It should be understood that FIG. 9 is a schematic diagram illustrating the manner in which the conductive path segments P1C-P6C inclusive are interconnected to form the wire mesh WM. Thus, starting from an input terminal TA, the path proceeds to the conductive island B1 on the printed circuit board 14, via conductive material 40 to the conductive island P3L1 on the side plate P3. The path continues through the conductive path segment P3C on the plate P3 to the conductive island P3L2 and hence via conductive material 40 to the conductive island B2 on the printed circuit board 14. The path continues via a conductive lead 50 on the printed circuit board 14 to the conductive island B3 on the printed circuit board 14 and hence via conductive material 40 to conductive island P2L1 on the side plate P2. It will be appreciated that the path continues in a similar manner, through the conductive path segments on the side plates P2, P5 and P4 via the conductive leads 52, 54 on the printed circuit board 14, which interconnect respective conductive island pairs B4, B5, B6, B7 on the printed circuit board 14.

Proceeding from conductive path segment P4C on the side plate P4, the path continues via conductive island B8 and conductive lead 56 on the printed circuit board to the plated through hole B9 in the printed circuit board 14. The plated through hole B9 connects to the electrically conductive wire 58 (FIG. 2) which extends vertically to contact the island P1L1 on the top plate P1. The path continues through the conductive path segment P1C on the top plate P1 to the island P1L2 and hence via the vertically extending electrically conductive wire 60, FIG. 2, to the plated through hole B10 in the printed circuit board 14. The path continues through a conductive lead 62 on the printed circuit board 14 to the electrically conductive region B11 which extends through the printed circuit board 14 to the lower surface thereof. The conductive region B11 connects via conductive material 40 with the conductive island P6L1 which connects to conductive path segment P6C on the base plate P6. The path continues via the conductive island P6L2 to the conductive region B12 on the printed circuit board 14 which connects to an output terminal TB, FIG. 9.

Although the conductive leads 50, 52, 54, 56, 62 on printed circuit board 14 are shown as being provided on the upper surface thereof, it will be appreciated that portions of such conductive leads could be disposed, via feed-through connections in the board 14, on the lower side of the board 14, to allow for the disposition of the circuit segments 16A-16D inclusive (FIG. 2) on the upper surface of the board 14.

The manner in which the security device 10 is assembled will now be described. First, the side plates, P2-P5 inclusive (FIG. 2) are attached together, using ceramic filled epoxy material. The assembly consisting of the side plates P2-P5 inclusive is then attached to the printed circuit board 14 using ceramic filled epoxy material 42 (FIG. 7). Next, the top plate P1, having the conductive wires 58, 60 attached thereto, is attached to the top edges of the side plates P2-P5 inclusive using ceramic filled epoxy 42 and the wires 58, 60 are passed through the plated holes B9, B10 in the printed circuit board 14, soldered in position, thereby electrically connecting the wires 58, 60 to the plating of the plated holes B9, B10 and the wire ends protruding beyond the soldered connection are cut off. Finally the base plate P6 is provided with conductive epoxy material (not shown) on the conductive islands P6L1, P6L2, and attached to the lower surface of the printed circuit board 14 using ceramic filled epoxy material 42, such that the conductive epoxy material contacts the conductive regions B11, B12 on the printed circuit 14. The thus assembled security device 10 is held together with a spring (not shown) while the epoxy material bonding is cured in an oven at about 125 degrees Celsius, after which the spring is removed. It will be appreciated that the security device 10 has the advantage that it can be manufactured by a simple and inexpensive procedure. Furthermore, once the device 10 is assembled, any attempt to remove the top plate P1 will result in the interruption of at least one of the conductive wires 58, 60.

In a modified embodiment, the four side plates P2-P5 inclusive are each provided with a pair of ceramic connecting pins which engage with holes in the printed circuit board 14 when the device is assembled. This arrangement assists in locating the side plates P2-P5 inclusive on the printed circuit board 14 when the security device 10 is assembled.

Figure 10:
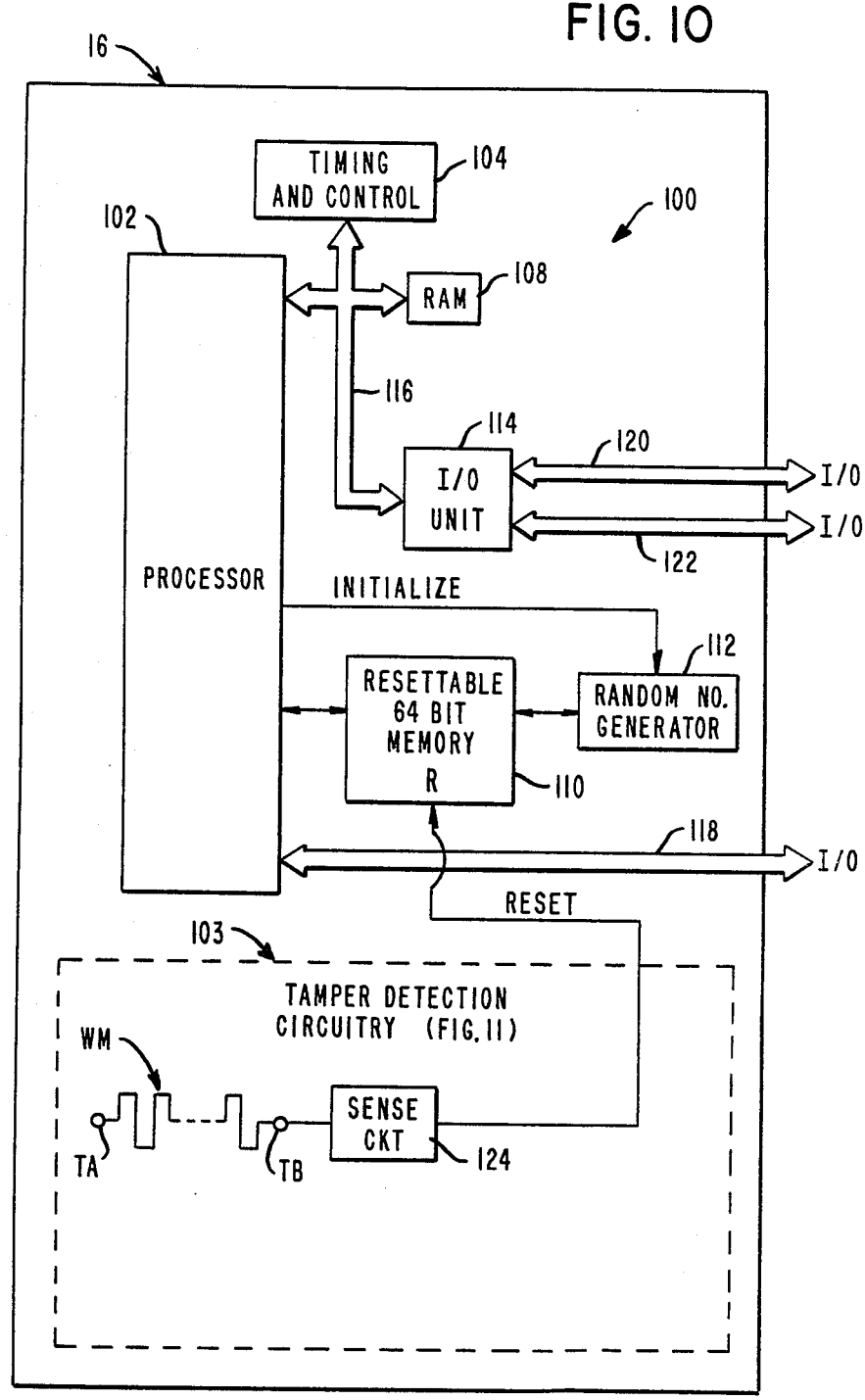
FIG. 10 is a block diagram illustrating the electrical circuitry within the security device.

Referring now to FIG. 10, the electronic circuitry 16 of FIG. 2 will now be discussed in more detail. The electronic circuitry 16 includes data processing circuitry 100 and tamper detection circuitry 103.

The data processing circuitry 100 can be utilized to perform any desired data processing operation systems, electronic fund transfers, data encryption/decryption, PIN (personal identification number) verification, data transmission/reception, access control and home banking. The data processing circuitry 100 includes a processor 102 for selectively controlling the operation of the electronic circuitry 16 in response to input data and instructions, a timing and control circuit 104 for controlling the operation of the processor 102, a random access memory (RAM) 108 for storing the software program to be executed by the processor 102 and for providing a temporary memory storage, a volatile memory 110 for storing most sensitive or secure data such as a key storage key (KSK) (to be explained hereinafter), a random number generator 112 and input/output (I/O) unit 114.

A data, control and address bus 116, bidirectional I/O bus 118 and I/O lines 120 and 122 are coupled to the processor 102, timing and control circuit 104, RAM 108 and I/O unit 114 to enable the data processing circuitry 100 to perform its data processing operations. Data may be passed over bidirectional I/O bus 118 to or from the processor 102 and over I/O lines 120 and 122 to or from the I/O unit 114. The remote ends of the I/O bus 118 and I/O lines 120 and 122 may be selectively coupled to, for example, another data processor (not shown), a main computer (not shown) and a peripheral (such as a keyboard) (not shown) via the connector 18 (FIG. 2) in order to enable the data processing circuitry 100 to perform its preselected operations.

Power to operate the electronic circuitry 16 is preferably supplied from external power sources (not shown), such as power supplies and batteries, via the connector 18.

An initialization subroutine, contained in the software program stored in the RAM 108, is executed in a special mode of operation controlled by an authorized person. Preferably, this initialization subroutine can only be executed once after the security device 10 has been completely assembled.

For purposes of additional security it is preferable that the volatile memory 110 be, for example, a resettable memory such as a 64-bit shift register memory.

During the execution of an INITIALIZE subroutine the processor 102 applies an INITIALIZE signal to the random number generator 112 to enable the generator 112 to generate a random number which is stored in the memory 110 as an exemplary sequence of 64 random bits. This sequence of 64 random bits is the KSK (key storage key), which is the most sensitive or secure data contained in the data processing circuitry 100. The KSK is utilized to encrypt keys which are to be entered into the security device 10 for storage in the RAM 108. Such keys are then used in data encryption operations. The precise manner in which the KSK is utilized is not of significance to the present invention and will, therefore, not be further described herein. It should, however, be noted that the resettable memory 110 stores the KSK, that the contents of the memory 110 should not be altered (if the security device 10 was programmed to run the initialization program only once), that the KSK is never outputted to the outside world from the security device 10, and that for purposes of security external access to the KSK contents of the memory 110 by various means must be prevented.

Tamper detection circuitry 103 is included in the electronic circuitry 16 to specifically destroy the KSK in the resettable memory 110 if there is any attempt to penetrate the housing 12 of the security device 10 to gain access to the KSK stored in the memory 110. It should be realized that if the KSK is destroyed, any encrypted data or keys stored in RAM 108 become meaningless or useless.

An attempt to penetrate the ceramic housing 12 of the security device 10 may be made by drilling into or cracking the housing 12. To protect against this possibility, the wire mesh WM of FIG. 9 is connected between a reference potential Vc and ground, and to a sense circuit 124. An attempt to drill into or crack the housing 12 that interrupts the wire mesh WM causes the sense circuit 124 to generate a reset signal. An attempt to remove the top plate P1 will result in at least one of the conductive wires 58, 60 being broken, thereby interrupting the wire mesh WM. Similarly, if the wire mesh WM is shorted by such an attempt, the sense circuit 124 will generate a reset signal.

Figure 11:
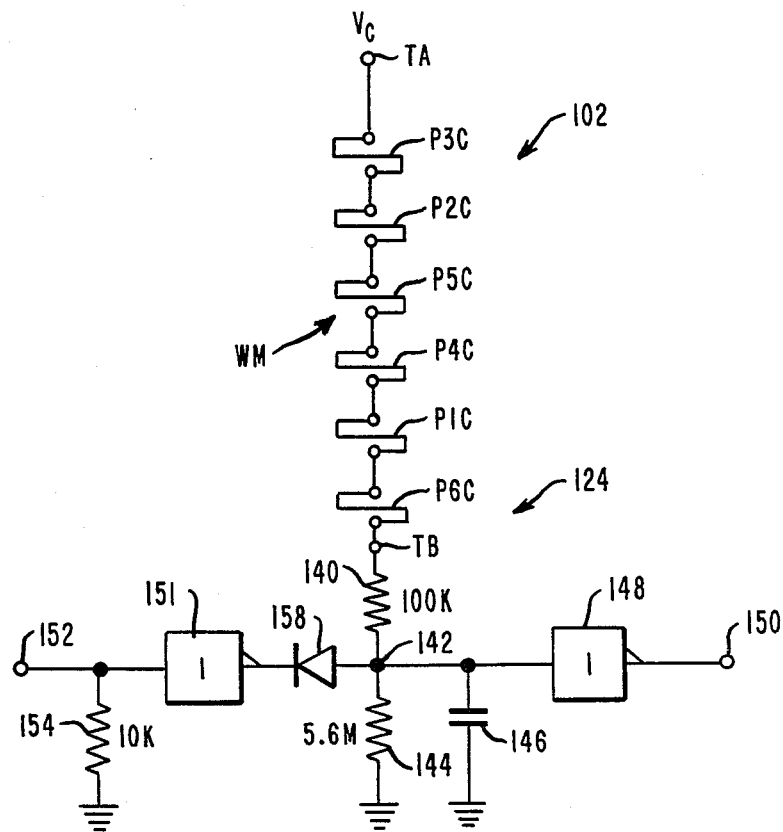
FIG. 11 is a circuit diagram of the tamper detection circuitry of FIG. 10.

Referring to FIG. 11, the tamper detection circuitry 103 will now be described. The terminal TB of the wire mesh WM is connected via a 100 kilohm resistor 140 to a junction point 142. The junction point 142 is connected via a 5.6 megohm resistor 144 to ground, to one side of a 22 microfarad capacitor 146, the other side of which is grounded, and to the input of an inverter 148. The output of the inverter 148 is connected to an output terminal 150 which is connected to the RESET input of the resettable memory 110.

Since the terminal TA of the wire mesh WM is connected to a reference voltage supply Vc, the capacitor 146 is normally maintained in a charged condition. An interruption in, or grounding of the wire mesh WM, however, will cause the capacitor 146 to discharge and thereby produce a positive going RESET pulse at the output of the inverter 148, which pulse is supplied via the output terminal 150 to reset the resettable memory 110.

The remaining components shown in FIG. 11 enable the memory 110 to be reset in response to an external reset signal applied, via the connector 18 (FIG. 2) to the terminal 152. The terminal 152 is connected via a 10 kilohm resistor 154 to ground and to the input of an inverter 151, the output of which is connected via an isolating diode 158 to the junction point 142. It will be appreciated that a positive-going input signal on the terminal 152 will produce a positive-going RESET pulse on the output terminal 150 to reset the resettable memory 110.

What is claimed is:

1. A security device for protecting stored sensitive data comprising:
    a closed housing containing memory means adapted to store sensitive data and including a top plate, a base plate and a plurality of side plates having conducted path segments formed in meandering configurations over substantially the entire inner surface areas of the respective parts;
    interconnection means arranged to electrically interconnect said conductive path segments to form conductive path means, the interruption of which, brought about by an attempt to penetrate said housing, causes the erasure of the contents of said memory means; and
    a printed circuit board on which said memory means is supported, wherein said side plates are mounted on the top surface of said printed circuit board which is mounted on said base plate, and wherein said interconnection means includes conductive track means provided on said printed circuit board and conductive wires extending from said top plate through electrically conductive apertures in said printed circuit board to thereby directly connect with a part of said conductive track means on said printed circuited board.

2. The security device as claimed in claim 1, wherein said conductive path segments are formed by a conductive thick film having thickness in the range of from 10 microns to about 15 microns.

3. The security device as claimed in claim 2, wherein said interconnection means includes electrically conductive epoxy material connecting conductive islands on said printed circuit board with conductive islands on said side plates.

4. The security device as claimed in claim 3, wherein said interconnection means includes electrically conductive epoxy material connecting conductive islands on said base plate with conductive regions extending through said printed circuit board.

5. The security device as claimed in claim 4, wherein said conductive path means is connected between voltage supply means and a reference potential means, and said device further includes a sensing circuit adapted to detect the interruption of the current path between said voltage supply means and said reference potential means.

6. The security device as claimed in claim 5, wherein said sensing circuit includes capacitive means connected to said conductive path means, and an inverter, responsive to the state of said capacitive means to produce a reset signal for resetting said memory means in response to interruption of said conductive path means.

* * * * *